US008730006B2

(12) United States Patent
Kishimoto (10) Patent No.: US 8,730,006 B2
(45) Date of Patent: May 20, 2014

(54) ENGINE CONTROL UNIT (75) Inventor: Yasuaki Kishimoto, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 884 days.

(21) Appl. No.: 12/347,718

(22) Filed: Dec. 31, 2008

(65) Prior Publication Data

US 2010/0005507 A1  Jan. 7, 2010

(30) Foreign Application Priority Data

Jul. 1, 2008 (JP) .................................. 2008-172280

(51) Int. Cl.
*G05B 19/00* (2006.01)

(52) U.S. Cl.
USPC ........ 340/5.8; 340/5.72; 340/5.1; 340/426.11

(58) Field of Classification Search
None
See application file for complete search history.

(56) References Cited

U.S. PATENT DOCUMENTS

| 5,708,307 | A | * | 1/1998 | Iijima et al. | 307/10.5 |
| 6,008,722 | A | * | 12/1999 | Hirozawa et al. | 340/426.35 |
| 2003/0076957 | A1 | * | 4/2003 | Asokan et al. | 380/270 |
| 2004/0066278 | A1 | * | 4/2004 | Hughes et al. | 340/10.1 |
| 2006/0028210 | A1 | * | 2/2006 | Yanagida et al. | 324/426 |
| 2006/0175900 | A1 | * | 8/2006 | Ono et al. | 307/10.1 |
| 2007/0257769 | A1 | * | 11/2007 | Matsubara et al. | 340/5.61 |

FOREIGN PATENT DOCUMENTS

| JP | 08150897 | A |   | 6/1996 |         |
| JP | 3511700 | B2 |   | 3/2004 |         |
| JP | 2004-276760 | A |   | 10/2004 |         |
| JP | 2004-351987 | A |   | 12/2004 |         |
| JP | 2007-290618 |   | * | 11/2007 | .............. B60R 24/04 |
| JP | 2007290618 | A |   | 11/2007 |         |

OTHER PUBLICATIONS

Japanese Office Action corresponding to Japanese Patent Application No. 2008-172280, dated Apr. 30, 2010.

* cited by examiner

*Primary Examiner* — Mohammad Ghayour
*Assistant Examiner* — Brian Wilson
(74) *Attorney, Agent, or Firm* — Sughrue Mion, PLLC (57) ABSTRACT

Provided is an engine control unit, which supports an antitheft system outputting, when a key ID registered in a portable device matches an authentication-purpose key ID registered in a receiver, a receiver status signal that contains information indicating that the portable device has been authenticated, and which is initiated in response to an initiating instruction has not been issued from an external, includes: starting control unit for controlling a starting operation of an engine in response to a start permission signal; storage unit registered with an authentication-purpose receiver ID for authenticating the receiver; and antitheft function install/non-install judging unit for judging whether or not the antitheft function is installed to the moving object, in which, when the authentication-purpose receiver ID is not registered in the storage unit and the receiver status signal is not entered, the antitheft function install/non-install judging unit judges that the antitheft function is not installed, and outputs the start permission signal to the starting control unit.

5 Claims, 12 Drawing Sheets

ENGINE CONTROL UNIT

BACKGROUND OF THE INVENTION

1. Field of the Invention

The present invention relates to an engine control unit which is provided in, for instance, a moving object such as a ship. More specifically, the present invention relates to an engine control unit supporting an antitheft system.

2. Description of the Related Art

In a conventional antitheft apparatus, a receiver (immobilizer control unit) compares a key ID transmitted from a portable device with an authentication-purpose key ID which has been previously stored in the receiver, and when the transmitted key ID matches the stored authentication-purpose key ID, outputs a start permission signal of an engine to an engine control unit (ECU). Besides, the engine control unit controls start of the engines in response to the start permission signal (for instance, refer to JP 2004-351987 A).

However, the conventional technology has the following problems.

The engine control unit disclosed in JP 2004-351987 A is operable only for systems having an antitheft function. In other words, systems equipped with an antitheft function and other systems having no antitheft function are different from each other in configuration of engine control units, and dedicated programs and data are present in the respective engine control units.

As a consequence, in a case where the antitheft function is required, it is required to employ an engine control unit properly adapted to the system having the antitheft function. When an antitheft function is added to a system which has no such an antitheft function, the engine control unit itself needs to be replaced by another engine control unit. Otherwise, a program of the engine control unit must be changed.

As a result, there is a problem that the antitheft function cannot be easily mounted after the engine control unit is assembled.

SUMMARY OF THE INVENTION

The present invention has been made to solve the above-mentioned problems, and therefore, an object thereof is to provide an engine control unit capable of being operated irrespective of whether or not an antitheft function is installed, and being readily installed with the antitheft function after the engine control unit is assembled.

According to the present invention, there is provided an engine control unit, which supports an antitheft system outputting, when a key ID registered in a portable device carried by a user of a moving object matches an authentication-purpose key ID registered in a receiver provided in the moving object, a receiver status signal that contains information indicating that the portable device has been authenticated, and which is initiated in response to an initiating instruction has not been issued from an external, the engine control unit including: starting control means for controlling a starting operation of an engine in response to a start permission signal; storage means registered with an authentication-purpose receiver ID for authenticating the receiver; and antitheft function install/non-install judging means for judging whether or not an antitheft function is installed to the moving object, in which, when the authentication-purpose receiver ID is not registered in the storage means and the receiver status signal is not entered, the antitheft function install/non-install judging means judges that the antitheft function is not installed, and outputs the start permission signal to the starting control means.

According to the engine control unit of the present invention, in a case where the authentication-purpose receiver ID is not registered in the storage means, and also the receiver status signal is not entered, the antitheft function install/non-install judging means judges that the engine control unit is not equipped with the antitheft function, and then outputs the start permission signal.

As a result, it is possible to obtain the engine control unit capable of being operated irrespective of whether or not the antitheft function is installed, and being readily installed with the antitheft function after the engine control unit is assembled.

DETAILED DESCRIPTION OF THE PREFERRED EMBODIMENTS

Referring now to drawings, a description is made of embodiments of the present invention. It should be noted that the same reference numerals are employed for denoting the same, or similar structural elements shown in the respective drawings.

In the following embodiments, as a moving object in which an engine control unit of the present invention is provided, for example, a ship is taken as an example. However, the present invention is not limited to the ship, and the engine control unit may be alternatively provided in moving objects such as a vehicle and an aircraft.

First Embodiment

Figure 1:
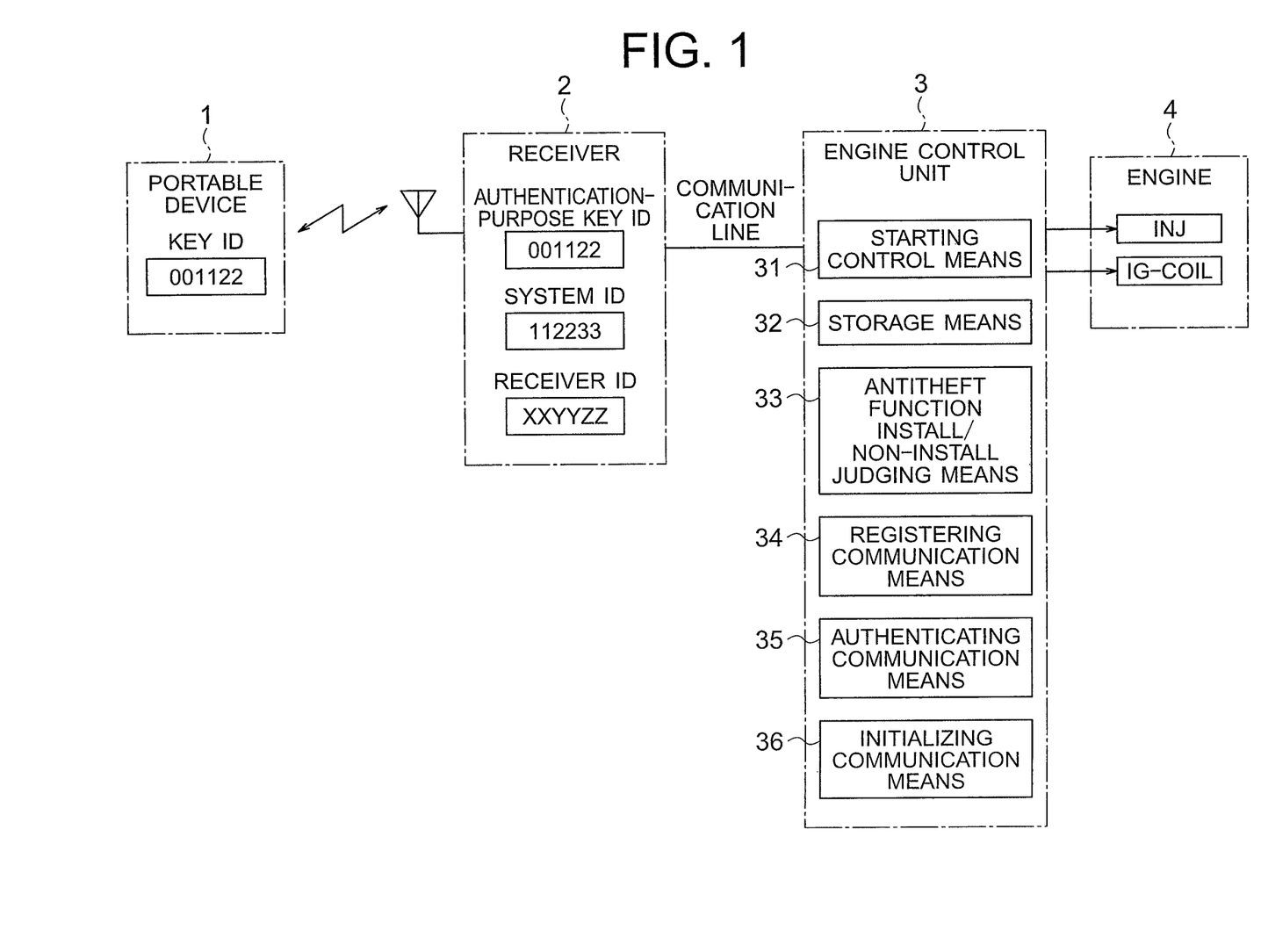
FIG. 1 is a block diagram showing an engine control unit according to a first embodiment of the present invention.

FIG. 1 is a block diagram showing an antitheft system which contains an engine control unit 3 according to a first embodiment of the present invention.

In FIG. 1, the antitheft system includes a portable device 1, a receiver 2, and the engine control unit 3. The portable device 1 is carried by a user of the ship. The receiver 2 is installed in the ship. The engine control unit 3 is provided in the ship so as to control operations of an engine 4. The receiver 2 is connected to the engine control unit 3 via a communication line. It should be noted that the portable device 1 is a key of the engine 4 or the like.

A specific key ID is registered in the portable device 1.

In the receiver 2, an authentication-purpose key ID for authenticating the portable device 1, a system ID which is an ID commonly used in the antitheft system, and a specific receiver ID are registered.

The receiver 2 compares a key ID of the portable device 1 with the authentication-purpose key ID, and when both the key IDs coincide with each other, outputs a receiver status signal which contains a status that the authentication of the portable device 1 is finished as information.

The engine control unit 3 includes starting control means 31, storage means 32, antitheft function install/non-install judging means 33, registering communication means 34, authenticating communication means 35, and initializing communication means 36.

Hereinafter, a description is made of functions of the above-mentioned respective means of the engine control unit 3.

The starting control means 31 controls a starting operation of the engine 4 in response to a start permission signal outputted from the antitheft function install/non-install judging means 33 or the authenticating communication means 35.

In the storage means 32, a system ID, which is an ID commonly used in the antitheft system and is identical to the system ID registered in the receiver 2, is stored. Besides, an authentication-purpose receiver ID for authenticating the receiver 2 is registered in the storage means 32.

Figure 2:
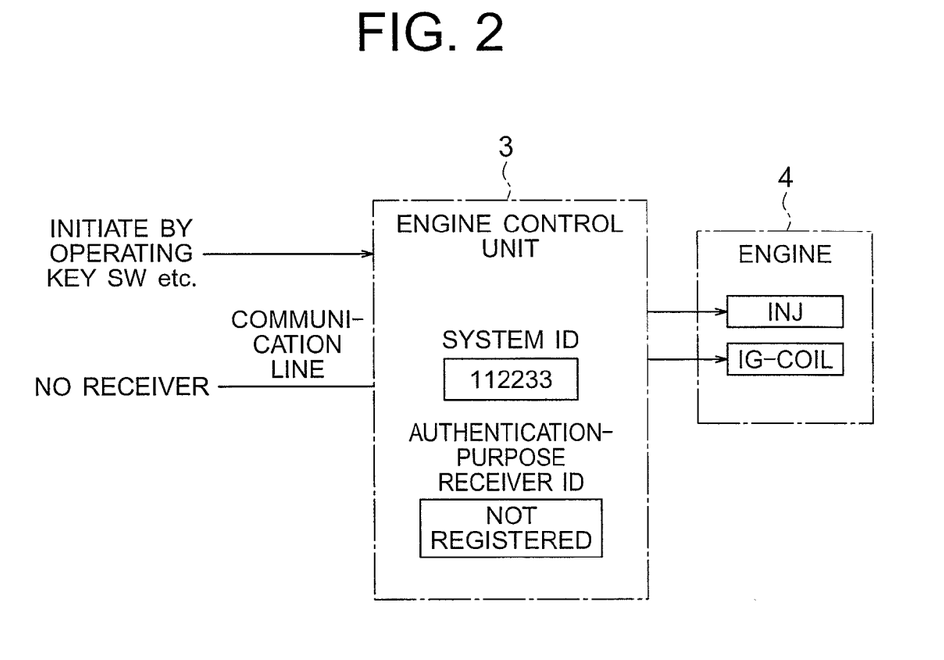
FIG. 2 is a configurational diagram showing a system having no antitheft function, in which the engine control unit according to the first embodiment of the present invention is employed.
Figure 3:
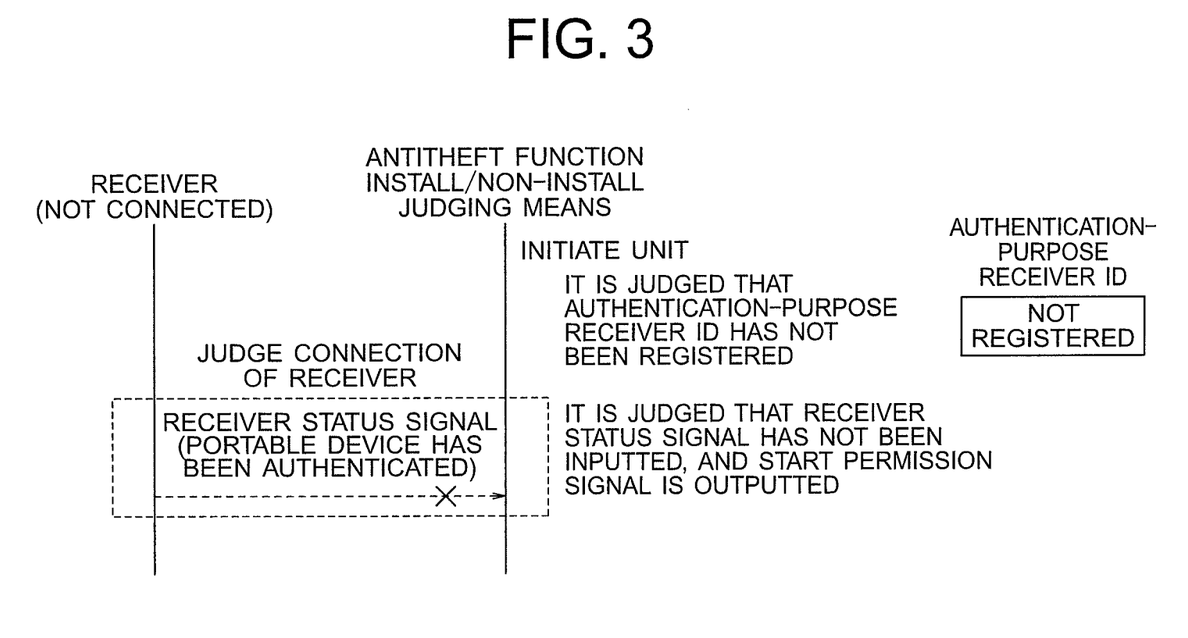
FIG. 3 is a sequential diagram showing processings of antitheft function install/non-install judging means in the system having no antitheft function according to the first embodiment of the present invention.

Referring now to FIG. 2 and FIG. 3, the function of the antitheft function install/non-install judging means 33 is described in detail.

FIG. 2 is a configurational diagram showing a system having no antitheft function, in which the engine control unit 3 according to the first embodiment of the present invention is employed. It should be noted that only registered contents of the storage means 32 are illustrated in a block of the engine control unit 3 in FIG. 2.

In FIG. 2, the receiver 2 is not connected to the engine control unit 3, and the authentication-purpose receiver ID is not registered in the storage means 32. At this time, a unit of the engine control unit 3 is initiated by, for example, a key SW (initiation instruction).

FIG. 3 is a sequential diagram showing processings of the antitheft function install/non-install judging means 33 in the system having no antitheft function according to the first embodiment of the present invention.

In FIG. 3, first, the antitheft function install/non-install judging means 33 judges whether or not an authentication-purpose receiver ID is registered in the storage means 32, and then judges that the authentication-purpose receiver ID is not registered.

Next, the antitheft function install/non-install judging means 33 judges whether or not a receiver status signal is entered, that is, judges whether or not the receiver 2 is connected, and then judges that the receiver status signal is not entered.

Subsequently, because the authentication-purpose receiver ID is not registered in the storage means 32, and further the receiver status signal is not entered, the antitheft function install/non-install judging means 33 judges that the antitheft function is not employed, and thus outputs a start permission signal to the starting control means 31.

It should be noted that when the antitheft function install/non-install judging means 33 judges that the authentication-purpose receiver ID is registered, or judges that the receiver status signal is entered, the antitheft function install/non-install judging means 33 does not output the start permission signal.

Figure 4:
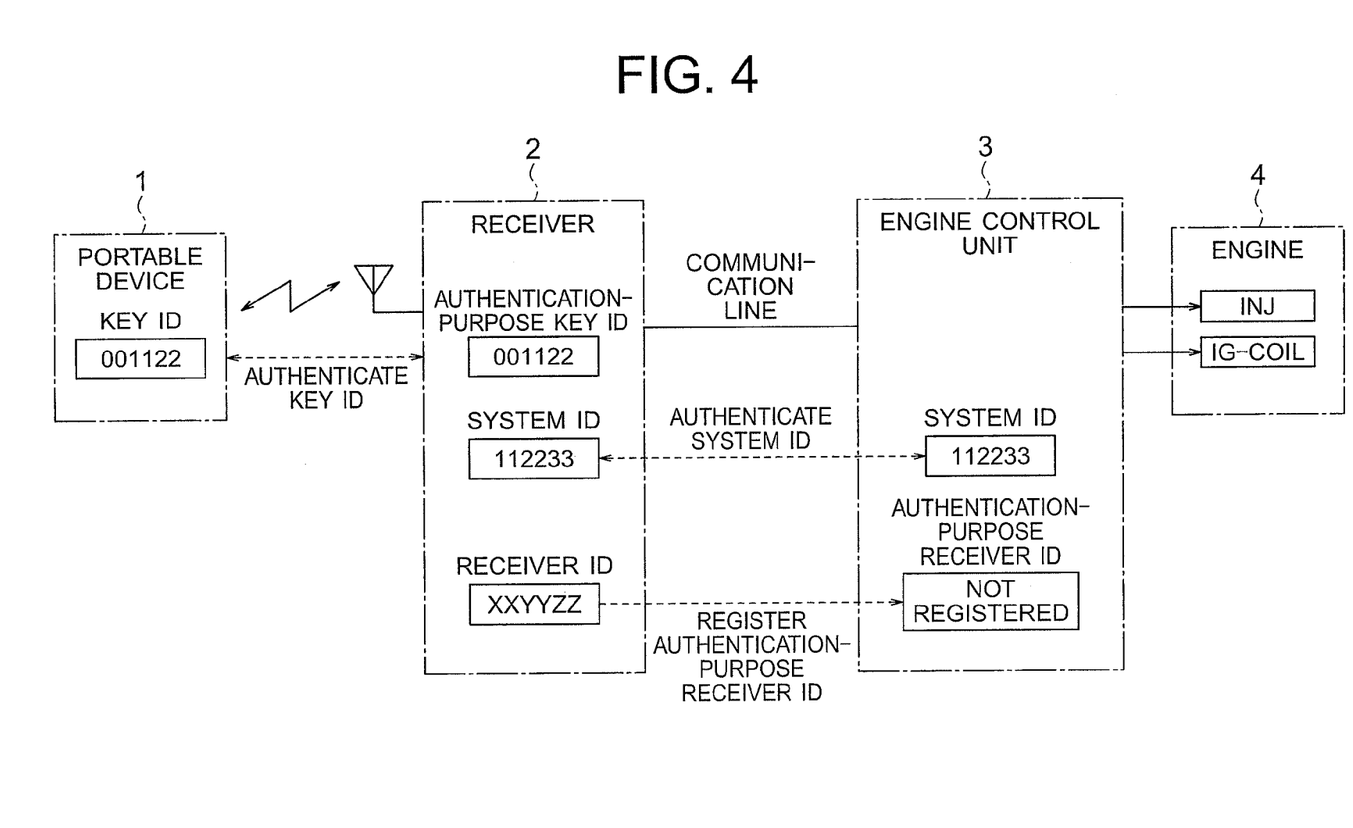
FIG. 4 is a configurational diagram showing such a state in which both a receiver and a portable device are added to the system having no antitheft function, in which the engine control unit according to the first embodiment of the present invention is employed.
Figure 5:
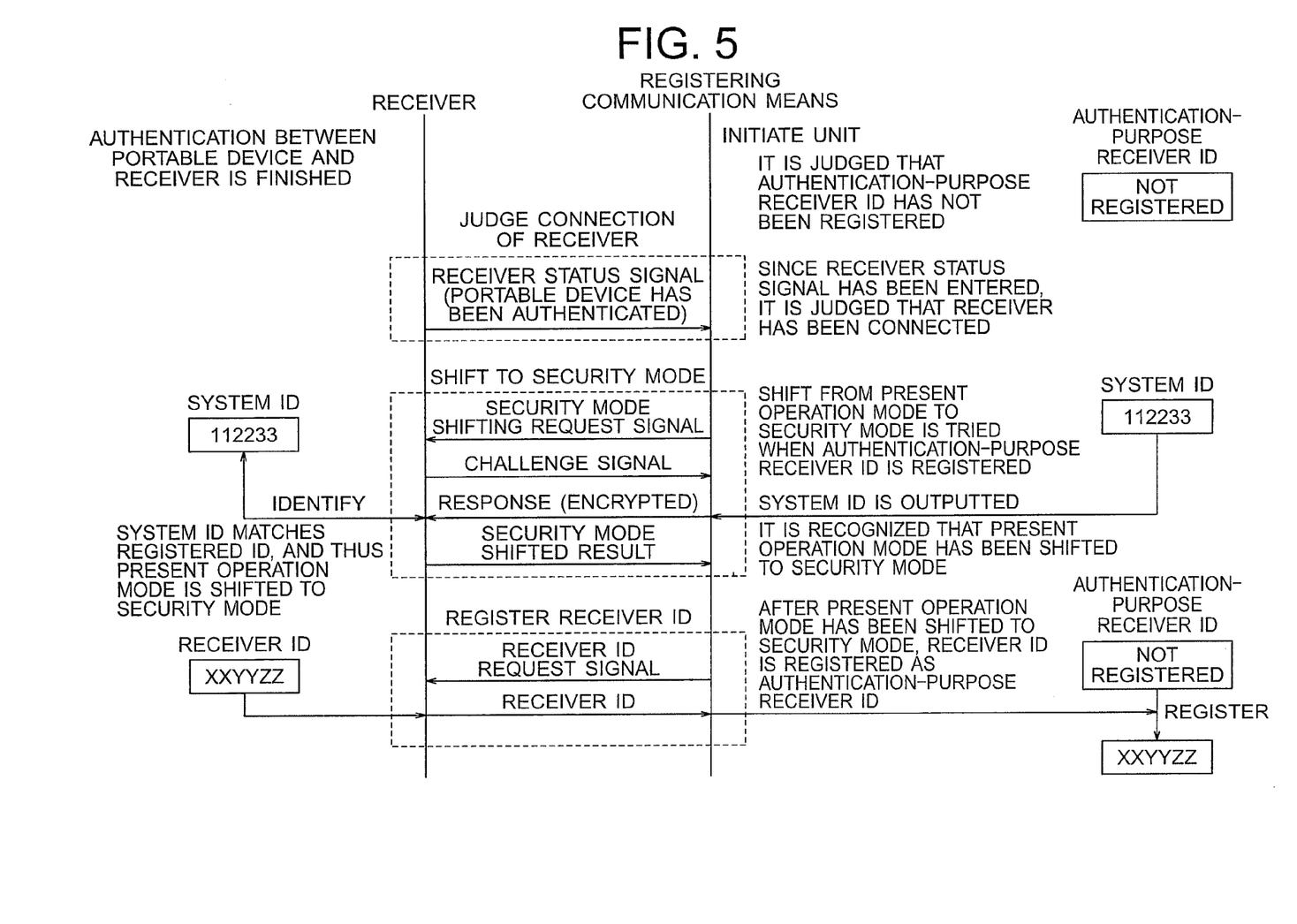
FIG. 5 is a sequential diagram showing processings executed by the receiver and registering communication means in a state where both the receiver and the portable device are added to the system having no antitheft function according to the first embodiment of the present invention.

Next, a detailed description is made of a function of the registering communication means 34 with reference to FIG. 4 and FIG. 5.

FIG. 4 is a configurational diagram showing a state in which both the receiver 2 and the portable device 1 are added to the system having no antitheft function, in which the engine control unit 3 according to the first embodiment of the present invention is employed. It should be noted that only registered contents of the storage means 32 are illustrated in a block of the engine control unit 3 in FIG. 4.

In FIG. 4, the receiver 2 is connected to the engine control unit 3, but the authentication-purpose receiver ID is not registered in the storage means 32.

FIG. 5 is a sequential diagram showing processings executed by the receiver 2 and registering communication means 34 in a state where both the receiver 2 and the portable device 1 are added to the system having no antitheft function according to the first embodiment of the present invention. It is assumed that authentication between the portable device 1 and the receiver 2 is finished in FIG. 5.

In FIG. 5, first, the registering communication means 34 judges whether or not an authentication-purpose receiver ID is registered in the storage means 32, and then judges that the authentication-purpose receiver ID is not registered.

Since the authentication of the portable device 1 has been finished, the receiver 2 has already outputted a receiver status signal.

Next, the registering communication means 34 monitors a communication for a predetermined period of time, and judges whether or not the receiver status signal is entered, that is, judges whether or not the receiver 2 is connected. Since the receiver status signal is entered, the registering communication means 34 judges that the receiver 2 is connected.

Subsequently, in order to shift the present operation mode to a security mode where an authentication-purpose receiver ID is registered, the registering communication means 34 outputs a security mode shifting request signal to the receiver 2. The receiver 2 outputs a challenge signal to the security mode shifting request signal.

Next, the registering communication means 34 outputs an encrypted system ID as a response to the challenge signal. The receiver 2 confirms that the system ID supplied from the registering communication means 34 matches the own system ID, and shifts the present operation mode thereof to the security mode. Thereafter, the receiver 2 outputs a security mode shift result to the registering communication means 34.

Subsequently, in order to register the authentication-purpose receiver ID, the registering communication means 34 outputs a receiver ID request signal to the receiver 2. The receiver 2 outputs a receiver ID to the receiver ID request signal.

Next, the registering communication means 34 registers the receiver ID outputted from the receiver 2 as the authentication-purpose receiver ID in the storage means 32. As a result, both the engine control unit 3 and the receiver 2 can establish a pairing therebetween.

When the registering communication means 34 registers the authentication-purpose receiver ID, the registering communication means 34 outputs a finish request signal of the security mode, and thus finishes the security mode.

It should be noted that in a case where the authentication-purpose receiver ID is registered in the storage means 32, even when the receiver status signal is entered from the receiver 2, the registering communication means 34 does not again register the authentication-purpose receiver ID.

As a consequence, it is possible to avoid an erroneous update of the authentication-purpose receiver ID.

Figure 6:
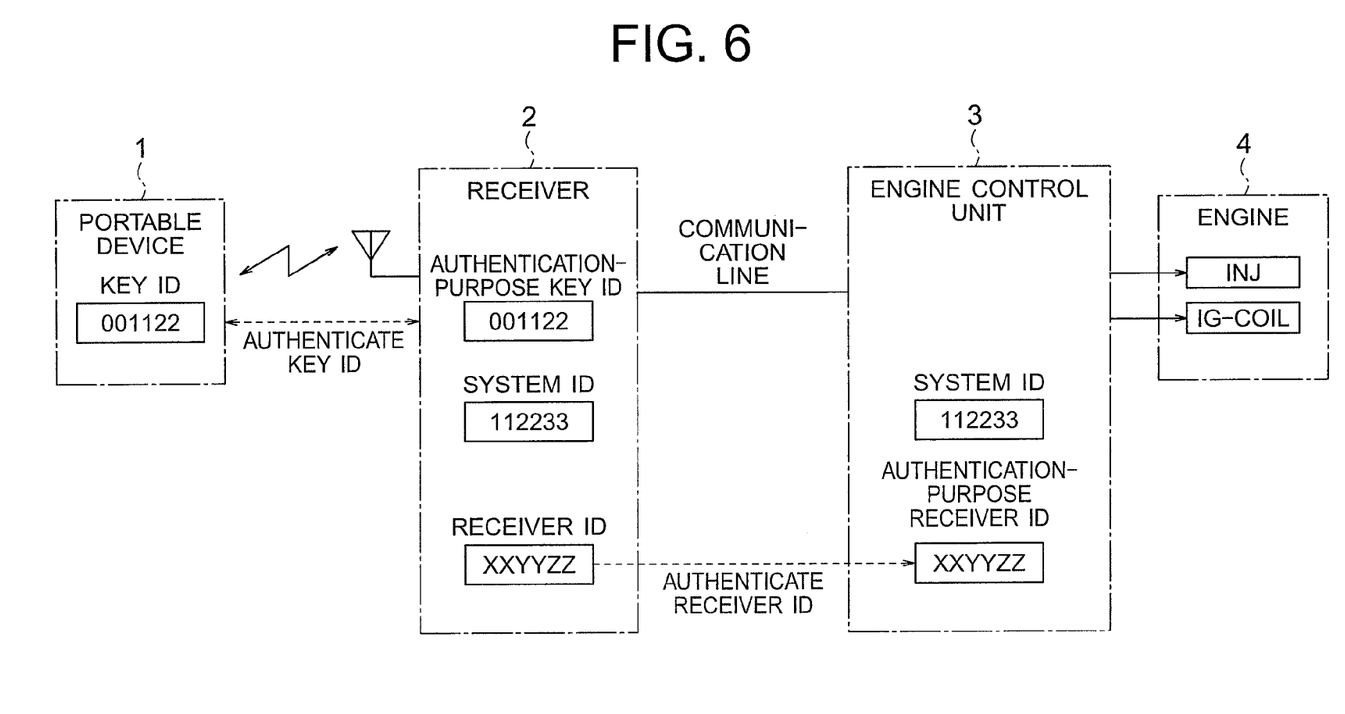
FIG. 6 is a configurational diagram showing a system having the antitheft function, in which the engine control unit according to the first embodiment of the present invention is employed.
Figure 7:
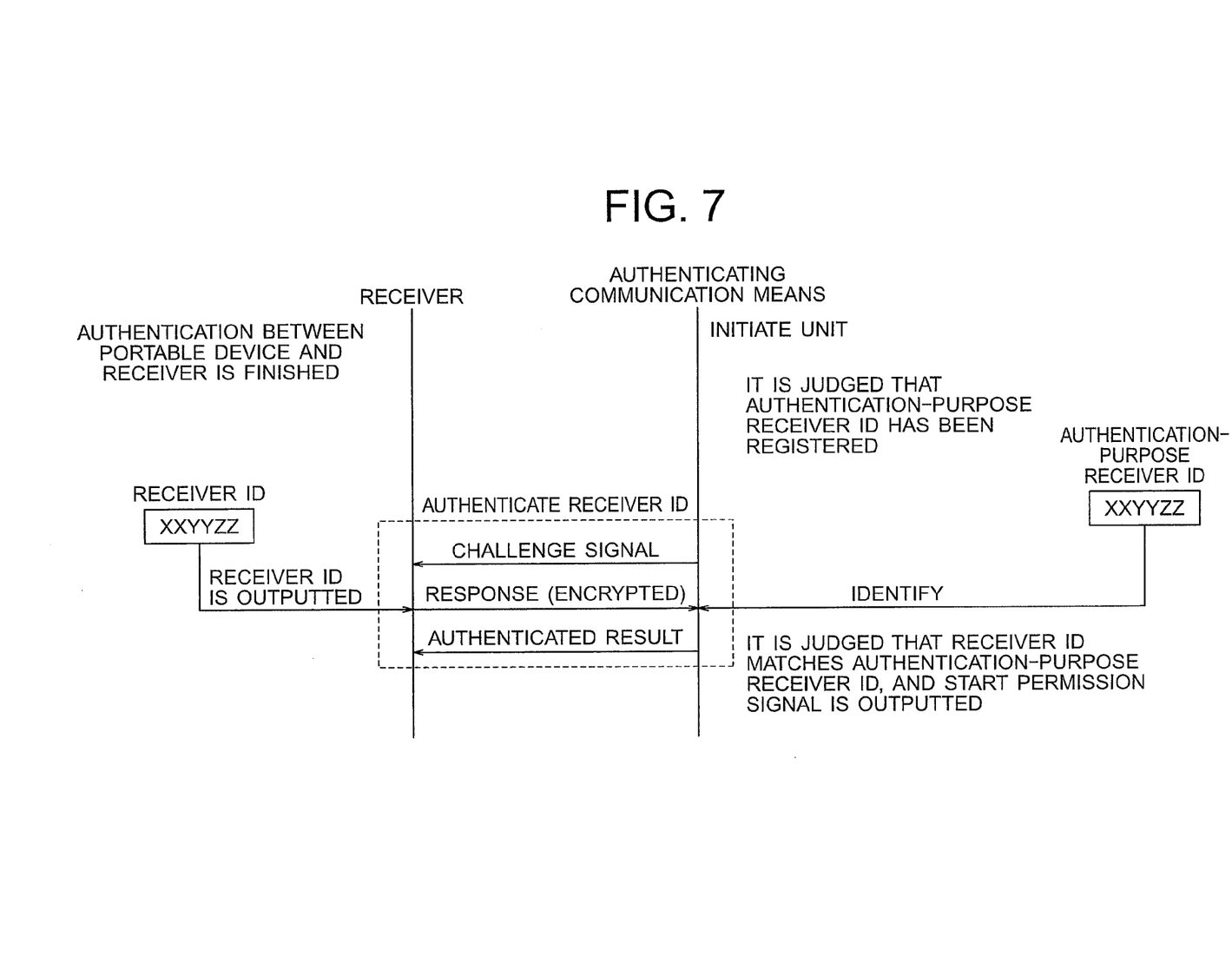
FIG. 7 is a sequential diagram showing processings executed by the receiver and authentication communication means in the system having the antitheft function according to the first embodiment of the present invention.

Next, referring to FIG. 6 and FIG. 7, a detailed description is made of functions of the authenticating communication means 35.

FIG. 6 is a configurational diagram showing a system having the antitheft function, in which the engine control unit 3 according to the first embodiment of the present invention is employed. It should be noted that only registered contents of the storage means 32 are illustrated in a block of the engine control unit 3 in FIG. 6.

In FIG. 6, the receiver 2 is connected to the engine control unit 3, and an authentication-purpose receiver ID is registered to the storage means 32.

FIG. 7 is a sequential diagram showing processings executed in the receiver 2 and authentication communication means 35 in the system having the antitheft function according to the first embodiment of the present invention. It is assumed that authentication between the portable device 1 and the receiver 2 is finished in FIG. 7.

In FIG. 7, first, the authentication communication means 35 judges whether or not an authentication-purpose receiver ID is registered in the storage means 32, and then judges that the authentication-purpose receiver ID is registered.

Next, in order to authenticate the receiver 2, the authenticating communication means 35 outputs a challenge signal to the receiver 2. The receiver 2 outputs an encrypted receiver ID as a response to the challenge signal.

Subsequently, the authenticating communication means 35 compares the encrypted receiver ID outputted from the receiver 2 with the authentication-purpose receiver ID. When the encrypted receiver ID matches the authentication-purpose receiver ID, the authenticating communication means 35 outputs a start permission signal to the starting control means 31, and outputs an authentication result to the receiver 2.

In the case of FIG. 7, because the encrypted receiver ID matches the authentication-purpose receiver ID, the authenticating communication means 35 outputs a start permission signal.

Figure 8:
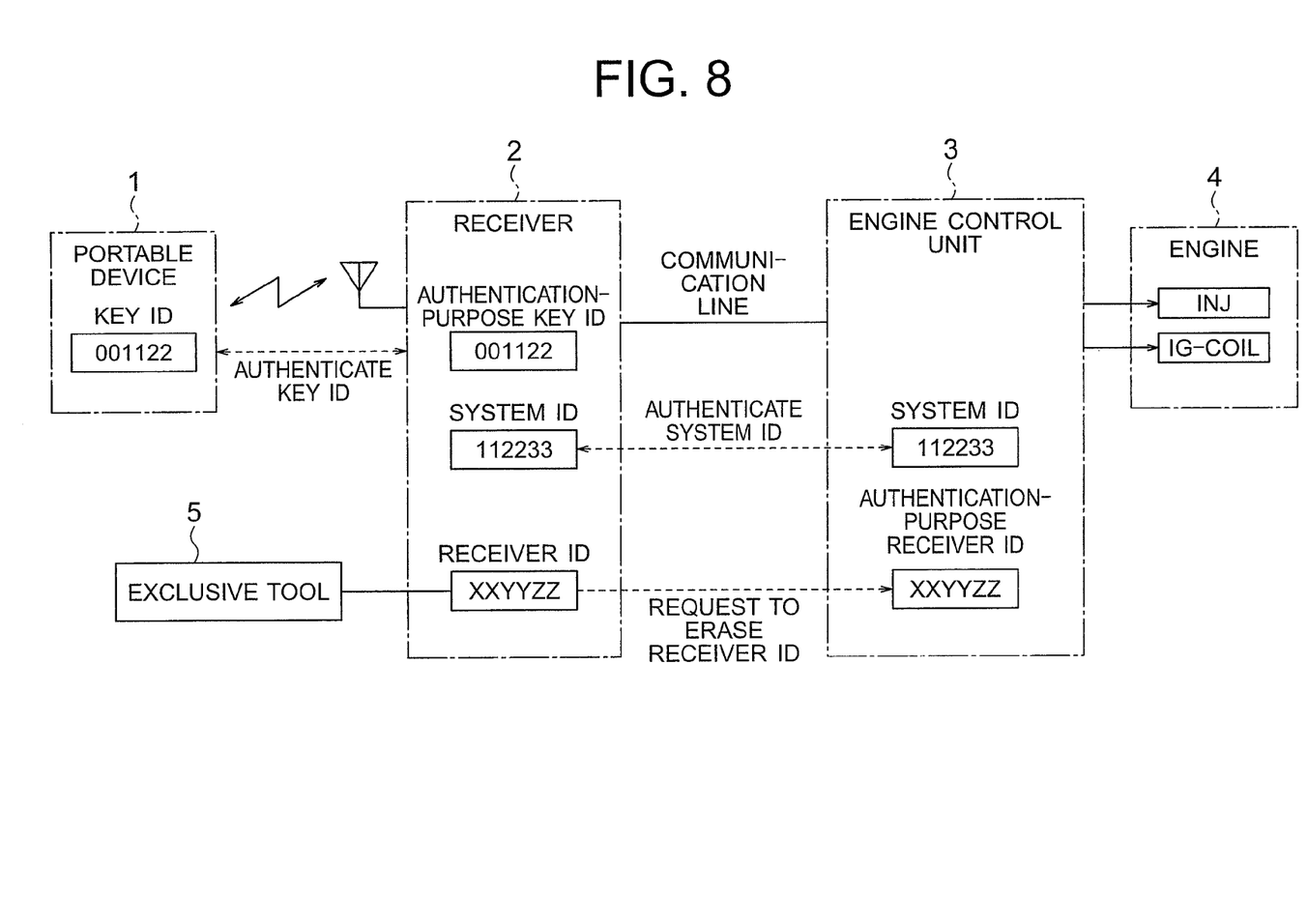
FIG. 8 is a configurational diagram showing a configuration for erasing authentication-purpose receiver ID in the system having the antitheft function, in which the engine control unit according to the first embodiment of the present invention is employed.
Figure 9:
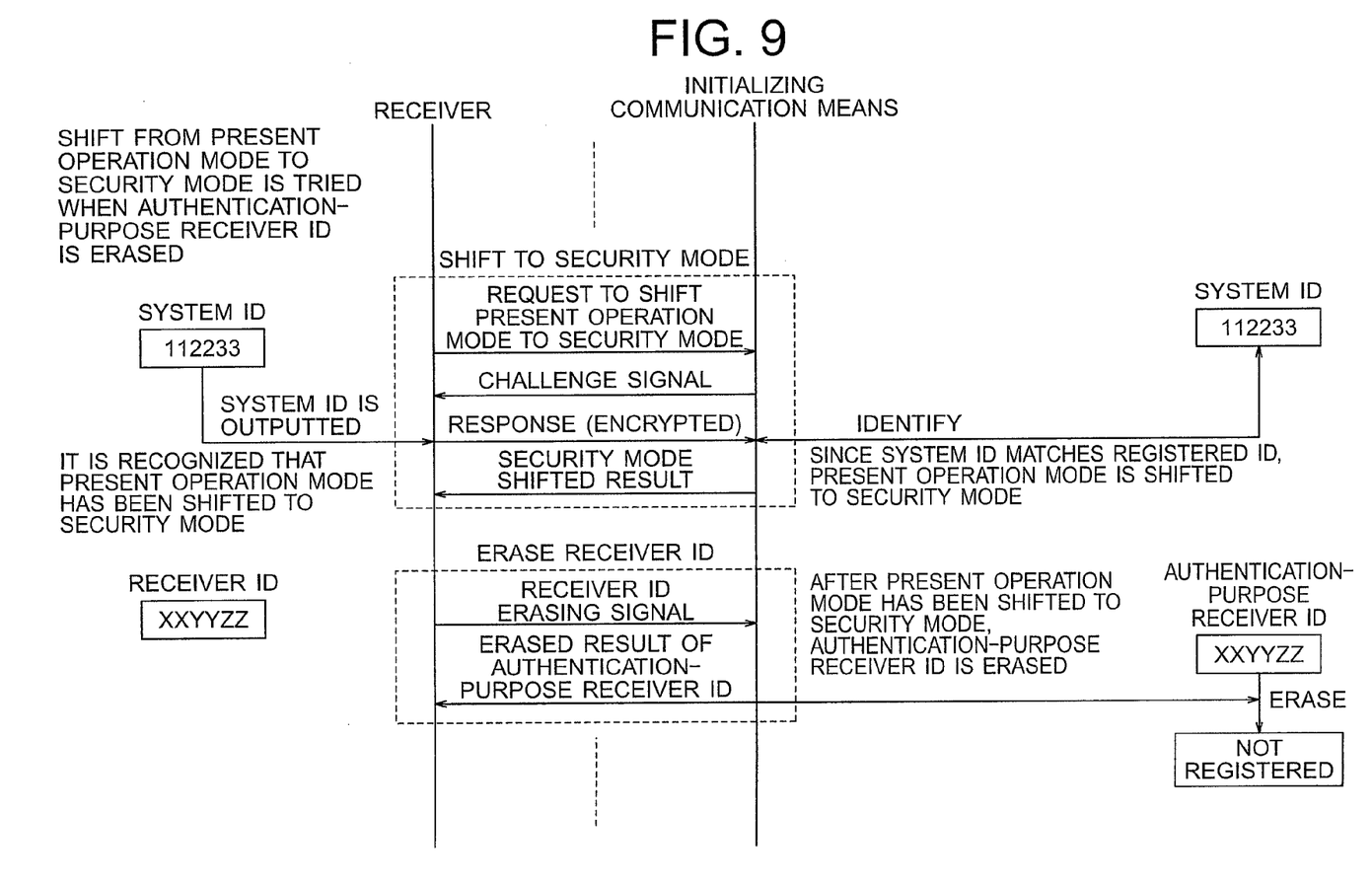
FIG. 9 is a sequential diagram showing processings of initializing communication means which erases the authentication-purpose receiver ID in the system having the antitheft function according to the first embodiment of the present invention.

Next, referring to FIG. 8 and FIG. 9, a detailed description is made of functions of the initializing communication means 36.

FIG. 8 is a configurational diagram showing a configuration for erasing an authentication-purpose receiver ID in the system having the antitheft function, in which the engine control unit 3 according to the first embodiment of the present invention is employed. It should be noted that only registered contents of the storage means 32 are illustrated in a block of the engine control unit 3 in FIG. 8.

In FIG. 8, the receiver 2 is connected to the engine control unit 3, and the authentication-purpose receiver ID is registered in the storage means 32.

Besides, an erasing request signal of the authentication-purpose receiver ID is entered from the receiver 2 by employing an exclusive tool 5. The exclusive tool 5 is employed in a case where the erasing request signal of the authentication-purpose receiver ID is outputted from the receiver 2 so as to erase the authentication-purpose receiver ID of the engine control unit 3.

FIG. 9 is a sequential diagram showing processings of the initializing communication means 36 which erases the authentication-purpose receiver ID in the system having the antitheft function according to the first embodiment of the present invention.

In FIG. 9, first, the receiver 2 outputs an erasing request signal for the authentication-purpose receiver ID so as to request the shift to the security mode. The initializing communication means 36 outputs a challenge signal to the erasing request signal for the authentication-purpose receiver ID.

Next, the receiver 2 outputs an encrypted system ID as a response to the challenge signal. The initializing communication means 36 confirms that the system ID supplied from the receiver 2 matches the own system ID, and then the present operation mode thereof is shifted to the security mode. Thereafter, the initializing communication means 36 outputs a security mode shift result to the receiver 2.

Subsequently, in order to erase the authentication-purpose receiver ID, the receiver 2 outputs a receiver ID erasing signal to the initializing communication means 36. The initializing communication means 36 erases the authentication-purpose receiver ID from the storage means 32 in response to the receiver ID erasing signal, and then outputs an erased result of the authentication-purpose receiver ID to the receiver 2.

Hereinafter, a description is made of operations of the engine control unit 3 having the above-mentioned configuration with reference to flow charts of FIG. 10 and FIG. 11.

Figure 10:
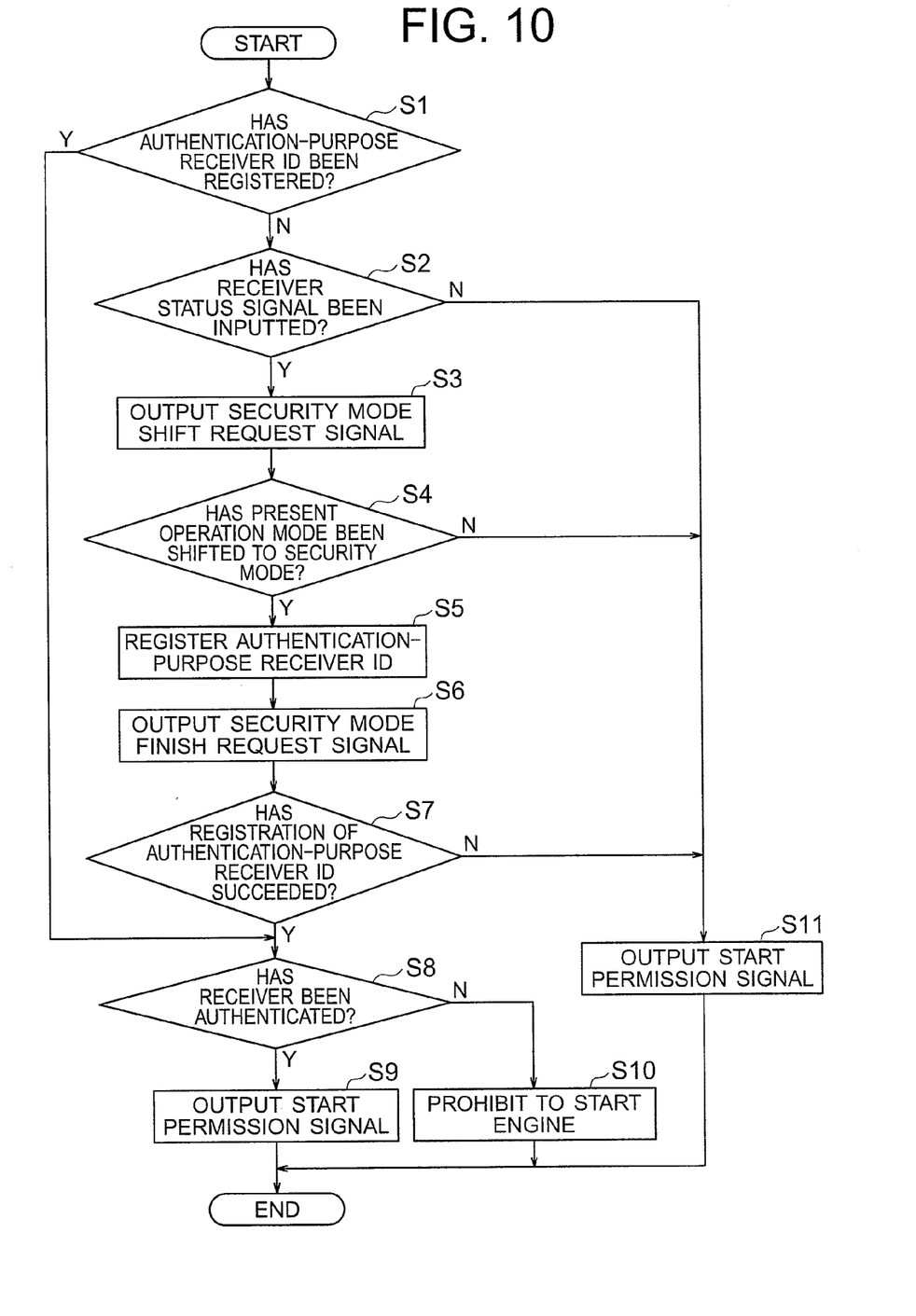
FIG. 10 is a flow chart showing operations of the antitheft function install/non-install judging means, the registering communication means and the authentication communication means according to the first embodiment of the present invention.

FIG. 10 is a flow chart showing operations of the antitheft function install/non-install judging means 33, the registering communication means 34, and the authenticating communication means 35 according to the first embodiment of the present invention. It should be noted that the processings of this flow chart are executed every time the unit of the engine control unit 3 is initiated.

In FIG. 10, first, the antitheft function install/non-install judging means 33, the registering communication means 34, and the authenticating communication means 35 judge whether or not an authentication-purpose receiver ID has been registered in the storage means 32 (Step S1).

In Step S1, when the antitheft function install/non-install judging means 33, the registering communication means 34, and the authenticating communication means 35 judge that the authentication-purpose receiver ID has not been registered (namely, "NO"), the antitheft function install/non-install judging means 33 and the registering communication means 34 judge whether or not a receiver status signal has been inputted (Step S2).

In Step S2, when the antitheft function install/non-install judging means 33 and the registering communication means 34 judge that the receiver status signal has been inputted (namely, "YES"), the registering communication means 34 outputs a security mode shifting request signal to the receiver 2 (Step S3), and judges whether or not the present operation mode has been shifted to a security mode (Step S4).

In the Step S4, when the registering communication means 34 judges that the present operation mode has been shifted to the security mode (namely, "YES"), the registering communication means 34 registers a receiver ID of the receiver 2 as an authentication-purpose receiver ID in the storage means 32 (Step S5).

Subsequently, the registering communication means 34 outputs a finish request signal of the security mode (Step S6), and then judges whether or not the registration of the authentication-purpose receiver ID has succeeded (Step S7).

In the case where the antitheft function install/non-install judging means 33, the registering communication means 34, and the authenticating communication means 35 judge that the authentication-purpose receiver ID has been registered (namely, "YES") in the Step S1 and the registering communication means 34 judges that the registration of the authentication-purpose receiver ID has succeeded (namely, "YES") in the Step S7, the authenticating communication means 35 compares a receiver ID outputted from the receiver 2 with the authentication-purpose receiver ID so as to judge whether or not the receiver 2 has been authenticated (Step S8).

In the Step S8, when the authenticating communication means 35 judges that the receiver 2 has been authenticated (namely, "YES"), the authenticating communication means 35 outputs a start permission signal to the starting control means 31 (Step S9), and then the processings of FIG. 10 are finished.

On the other hand, in the Step S8, when the authenticating communication means 35 judges that the receiver 2 has not been authenticated (namely, "NO"), the authenticating communication means 35 prohibits to start the engine 4 (Step S10), and then the processings of FIG. 10 are finished.

Further, in cases where the antitheft function install/non-install judging means 33 and the registering communication means 34 judge that the receiver status signal has not been inputted in the Step S2 (namely, "NO"), the registering communication means 34 judges that the present operation mode has not been shifted to the security mode in the Step S4 (namely, "NO"), and the registering communication means 34 judges that the registration of the authentication-purpose receiver ID has not succeeded in Step S7 (namely, "NO"), the antitheft function install/non-install judging means 33 or the registering communication means 34 outputs a start permission signal to the starting control means 31 (Step S11), and then the processings of FIG. 10 are finished.

Figure 11:
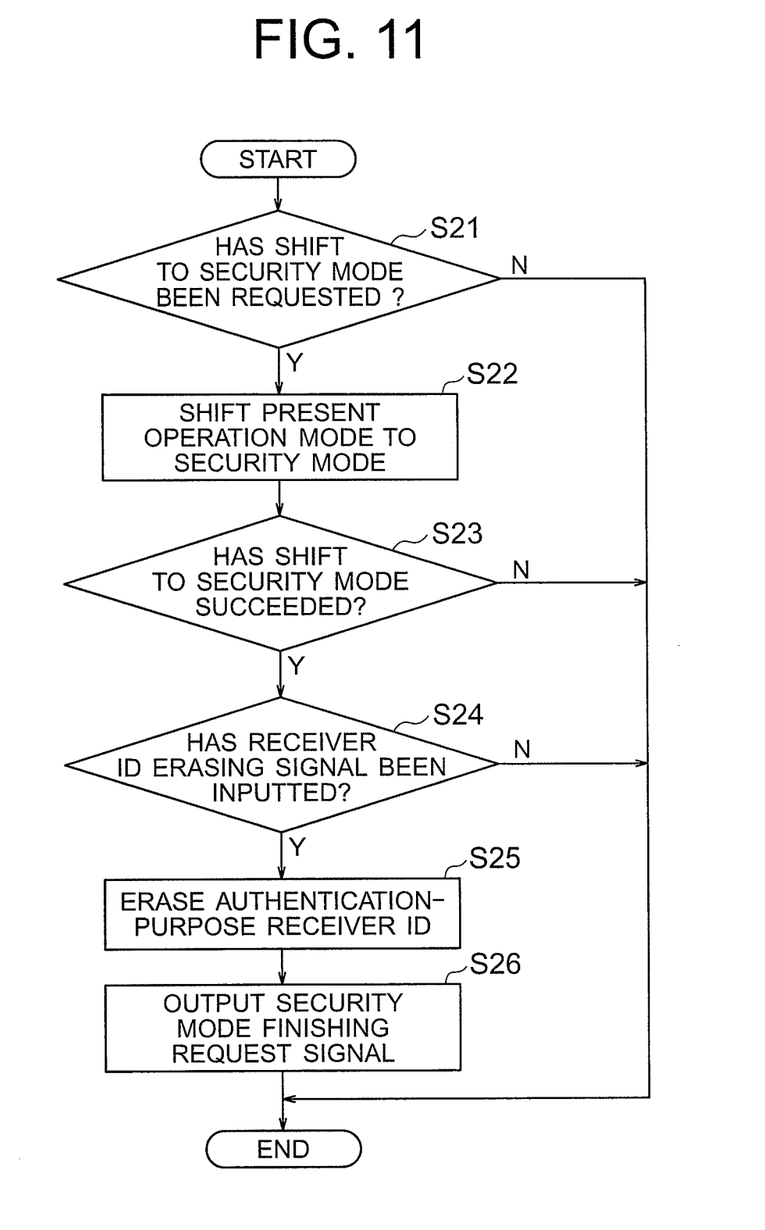
FIG. 11 is a flow chart showing operations of the initializing communication means according to the first embodiment of the present invention.

FIG. 11 is a flow chart showing operations of the initializing communication means 36 according to the first embodiment of the present invention.

In FIG. 11, first, the initializing communication means 36 judges whether or not a shift request to the security mode has been issued from the receiver 2 (Step S21).

When the initializing communication means 36 judges that the shift request to the security mode has been issued (namely, "YES"), the initializing communication means 36 shifts the present operation mode to the security mode (Step S22), and then judges whether or not the shift to the security mode has succeeded (Step S23).

In Step S23, when the initializing communication means 36 judges that the shift to the security mode has succeeded (namely, "YES"), the initializing communication means 36 judges whether or not a receiver ID erasing signal has been entered from the receiver 2 (Step S24).

In Step S24, when it is judged that the receiver ID erasing signal has been inputted (namely, "YES"), the initializing communication means 36 erases the authentication-purpose receiver ID from the storage means 32 (Step S25).

Subsequently, the initializing communication means 36 outputs a finishing request signal of the security mode (Step S26), and then the processings of FIG. 11 are finished.

On the other hand, in the cases where the initializing communication means 36 judges in Step S21 that the shift request to the security mode has not been issued (namely, "NO"), judges in Step S23 that the shift to the security mode has not succeeded (namely, "NO"), the initializing communication means 36 judges in Step S24 that the receiver ID erasing signal has not been entered (namely, "NO"), and directly finishes the processings of FIG. 11.

In accordance with the engine control unit 3 according to the first embodiment of the present invention, in a case where the authentication-purpose receiver ID has not been registered in the storage means 32, and the receiver status signal has not been inputted from the receiver 2, the antitheft function install/non-install judging means 33 judges that the antitheft function has not been installed, and thus outputs the start permission signal to the start control means 31.

As a consequence, the engine control unit 3 can be operated irrespective of whether or not the antitheft function has been installed, and the antitheft function can be easily installed after an engine control unit has been assembled.

Further, when the engine control unit 3 is commonly employed irrespective of whether or not the antitheft function has been installed, a probability that confusion may occur when the engine control unit 3 is mounted on a ship can be reduced, and thus a work efficiency can be improved.

In the case where both the receiver 2 and the portable device 1 are added to a system having no antitheft function, the registering communication means 34 confirms that the system ID registered in the receiver 2 matches the system ID registered in the storage means 32 as the IDs which are commonly used in the antitheft system, and then registers the receiver ID of the receiver 2 as the authentication-purpose receiver ID in the storage means 32.

In the conventional antitheft system, in a case where the information required to authenticate the relation between the receiver and the engine control unit is registered when the supply of the engine control unit is turned ON at a first time, the data identification between the receiver and the engine control unit is not carried out, and no confirmation is made whether or not the communication counter party is correct. As a result, there arises a problem in that there is a risk of registering erroneous information of other apparatus when a communication timing matches a communication timing of the other apparatus.

The registering communication means 34 according to the first embodiment of the present invention confirms that the system ID of the receiver 2 matches the system ID of the engine control unit 3. As a result, it is possible to avoid erroneous registration of the authentication-purpose receiver ID due to the error communication.

In a case where the erasing request signal for the authentication-purpose receiver ID outputted from the receiver 2 is inputted by employing the exclusive tool 5, the initializing communication means 36 confirms that the system IDs which are registered in the receiver 2 and the storage means 32 as the common ID to the antitheft system match each other, and then erases the authentication-purpose receiver ID from the storage means 32.

As a consequence, it is possible to avoid erroneous erase of the authentication-purpose receiver ID.

Further, even when a user of a ship loses the portable device 1 and cannot utilize the receiver 2, the receiver 2 can be quickly replaced by a new receiver.

Second Embodiment

Figure 12:
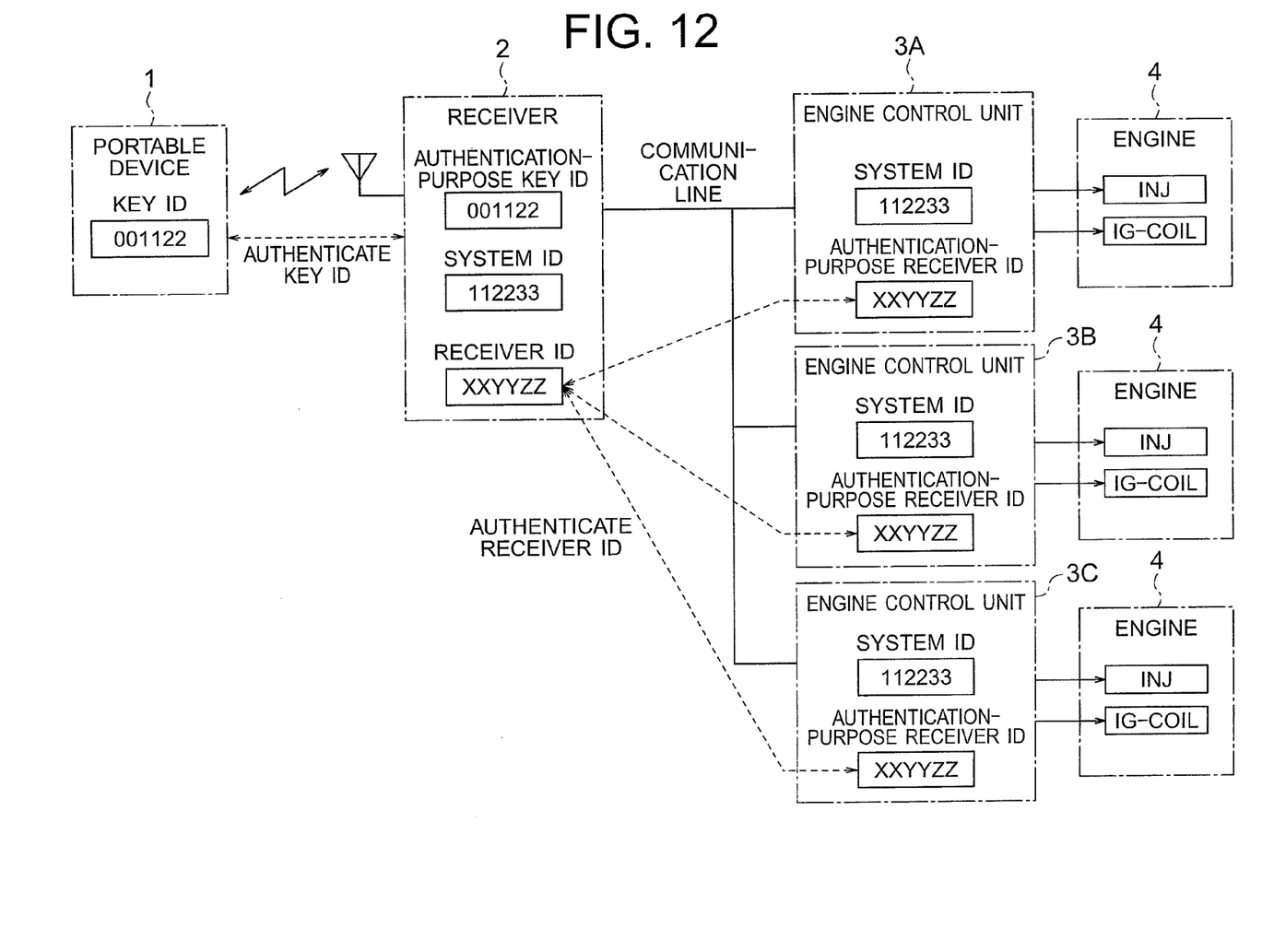
FIG. 12 is a configurational diagram showing a system having the antitheft function, in which an engine control unit according to a second embodiment of the present invention is employed.

FIG. 12 is a configurational diagram showing a system having an antitheft function, in which engine control units 3A to 3C according to a second embodiment of the present invention are employed. It should be noted that in FIG. 12, only registered contents of the storage means 32 are illustrated in blocks of the engine control units 3A to 3C.

In FIG. 12, three engine control units, that is, the engine control units 3A to 3C are connected to the receiver 2. Since configurations of the engine control units 3A to 3C are similar to those of the first embodiment described above, descriptions thereof are omitted. It should be noted that a total number of the engine control units which are connected to the receiver 2 is not limited to three, and may be two, four, or more.

As described in the first embodiment described above, the registering communication means 34 of the respective engine control units 3A to 3C confirm that the system ID of the receiver 2 coincides with the system IDs of the engine control unit 3A to 3C each other, and then register the receiver ID of the receiver 2 as an authentication-purpose receiver ID.

Besides, the authenticating communication means 35 of the respective engine control units 3A to 3C output start permission signals to the starting control means 31 in a case where the receiver ID of the receiver 2 matches the respective authentication-purpose receiver IDs registered in the storage means 32 of the engine control units 3A to 3C.

With the engine control units 3A to 3C according to the second embodiment of the present invention, for example, with respect to a moving object such as a ship which has a plurality of engines 4, there can be constructed an antitheft system in which the plurality of engines 4 can be controlled by one portable device 1 and one receiver 2.

What is claimed is:

1. An engine control unit, which supports an antitheft system outputting, when a key ID registered in a portable device carried by a user of a moving object matches an authentication-purpose key ID registered in a receiver provided in the moving object, a receiver status signal that contains information indicating that the portable device has been authenticated, the engine control unit comprising:
   starting control means for controlling a starting operation of an engine in response to a start permission signal;
   storage means for registering an authentication-purpose receiver ID for authenticating the receiver when an antitheft function is installed to the moving object; and
   antitheft function install/non-install judging means for judging whether or not the antitheft function is installed to the moving object,
   wherein, when the authentication-purpose receiver ID is not registered in the storage means and the receiver status signal is not entered, the antitheft function install/non-install judging means judges that the antitheft function is not installed,
   wherein, when the antitheft function install/non-install judging means judges that the antitheft function is not installed, the antitheft function install/non-install judging means outputs the start permission signal to the starting control means,
   wherein, when the authentication-purpose receiver ID is registered in the storage means or the receiver status signal is entered, the antitheft function install/non-install judging means judges that the antitheft function is installed, and
   wherein, when the antitheft function install/non-install judging means judges that the antitheft function is installed, the antitheft function install/non-install judging means does not output the start permission signal to the starting control means,
   and the engine control unit further comprising a registering communication means for registering the authentication-purpose receiver ID in the storage means, wherein, when the authentication-purpose receiver ID is not registered in the storage means and the receiver status signal is entered, the registering communication means confirms that a system ID registered in the receiver and a system ID registered in the storage means each registered as a commonly used ID in the antitheft system match each other, and then registers a receiver ID registered in the receiver as the authentication-purpose receiver ID.

2. An engine control unit according to claim 1, wherein in a case where the authentication-purpose receiver ID is registered in the storage means, even if the receiver status signal is entered, the registering communication means avoids registering again the authentication-purpose receiver ID.

3. An engine control unit according to claim 1, further comprising authenticating communication means for authenticating the receiver,
   wherein, when the authentication-purpose receiver ID is registered in the storage means and authentication of the portable device is finished by the receiver, the authenticating communication means compares the receiver ID registered in the receiver with the authentication-purpose receiver ID, and outputs the start permission signal when the registered receiver ID matches the authentication-purpose receiver ID.

4. An engine control unit according to claim 1, further comprising initializing communication means for erasing the authentication-purpose receiver ID registered in the storage means,
   wherein, when an erasing request signal of the authentication-purpose receiver ID is entered from the receiver, the initializing communication means confirms that said system ID registered in the receiver and said system ID registered in the storage means each registered as said commonly used ID in the antitheft system match each other, and then erases the authentication-purpose receiver ID.

5. An engine control unit according to claim 1, wherein a plurality of the engine control units are connected to the one receiver.

* * * * *